(12) United States Patent
Matczak et al.

(10) Patent No.: US 6,739,596 B2
(45) Date of Patent: May 25, 2004

(54) COMPARTMENT SEAL

(75) Inventors: Lois Z. Matczak, Ellington, CT (US); Stanley E. Matczak, Ellington, CT (US)

(73) Assignee: Seals-It, East Hartford, CT (US)

( * ) Notice: Subject to any disclaimer, the term of this patent is extended or adjusted under 35 U.S.C. 154(b) by 0 days.

(21) Appl. No.: 10/119,569

(22) Filed: Apr. 10, 2002

(65) Prior Publication Data

US 2003/0201613 A1 Oct. 30, 2003

(51) Int. Cl.⁷ .................................................. F16L 5/02
(52) U.S. Cl. ...................... 277/606; 277/616; 277/626; 277/634; 277/644; 174/65 G; 174/153 G
(58) Field of Search ................................ 277/606, 616, 277/626, 634, 637, 640, 644; 174/153 G, 65 G

(56) References Cited

U.S. PATENT DOCUMENTS

| | | | |
|---|---|---|---|
| 1,697,814 A | * 1/1929 | Forbes | 16/2.1 |
| 2,437,900 A | * 3/1948 | Winkeljohn | 277/576 |
| 2,510,362 A | * 6/1950 | Anderson | 464/175 |
| 2,620,208 A | * 12/1952 | Patch et al. | 277/504 |
| 2,820,088 A | * 1/1958 | Sperry | 174/153 G |
| 3,654,382 A | * 4/1972 | Rubright | 174/153 G |
| 4,278,115 A | * 7/1981 | Briles et al. | 141/86 |
| 4,383,692 A | * 5/1983 | Proctor | 277/606 |
| 4,712,800 A | * 12/1987 | Johnson | 277/314 |
| 4,819,919 A | * 4/1989 | Taylor | 267/64.13 |
| 5,018,748 A | * 5/1991 | Schalle | 277/641 |
| 5,069,571 A | 12/1991 | Matczak et al. | |
| 5,138,117 A | * 8/1992 | Oikawa et al. | 174/152 G |
| 5,209,596 A | 5/1993 | Matczak et al. | |
| 5,316,405 A | * 5/1994 | Atanasoski et al. | 403/28 |
| 5,318,480 A | * 6/1994 | Essi et al. | 464/175 |
| 5,603,304 A | 2/1997 | Matczak | |
| 5,659,924 A | * 8/1997 | Gildersleeve | 16/2.1 |
| 5,709,387 A | 1/1998 | Matczak | |
| 5,722,699 A | * 3/1998 | Brancher | 285/142.1 |
| 5,806,139 A | * 9/1998 | Anderson et al. | 16/2.1 |
| 5,941,535 A | * 8/1999 | Richard | 277/606 |
| 5,961,155 A | * 10/1999 | Youngs | 285/139.1 |
| 6,086,117 A | * 7/2000 | Youngs | 285/205 |

* cited by examiner

Primary Examiner—Alison K. Pickard
(74) Attorney, Agent, or Firm—Cantor Colburn LLP

(57) ABSTRACT

A compartment seal is disposed about an automotive tube or hose at the automotive firewall to prevent leakage of smoke and fumes generally from an engine compartment to an occupant compartment. The compartment seal comprises a rigid washer body member having a plurality of apertures circumferentially arranged around an opening therethrough,. The plurality of apertures is receptive to fasteners for attachment of the body member to the automotive firewall to provide a seal between the engine compartment and the occupant compartment. The tube or hose is attached to fittings at either end and passes through the opening in the body member. The body member includes a seal component within the opening configured to form a seal between a periphery of the hose and the seal component. The seal component is disposed within the opening of the body member. The seal component provides a seal between the tube or hose and the body member and allows significant angular displacement of the tube or hose from the centerline without compromising the integrity of the seal component between the body member and the tube or hose. The component seal comprises a resilient seal bonded to the body member disposed in the opening of the body member. The component seal is nonplanar having angles configured therein from the body member to a central opening, this central opening being smaller in diameter than the tube or hose passing therethrough to provide the necessary sealing tension.

19 Claims, 4 Drawing Sheets

COMPARTMENT SEAL

BACKGROUND OF THE INVENTION

This invention relates generally to seals. More specifically, this invention relates to a compartment seal for use primarily with automotive hoses and tubes extending between two compartments.

Compartment seals are known in the prior art. Such compartment seals comprise an aperture formed within a wall separating two compartments having a grommet circumferentially lining the aperture and sized to sealably engage the periphery of a hose or tube axially disposed within the grommet to provide a seal between the compartments while having the tube or hose extend in each compartment. Typically, one of the compartments is the engine compartment separated from an occupant compartment by a firewall or dash. It is necessary to prevent fumes and smoke produced in the engine compartment from passing through the firewall into the occupant compartment. Unless effectively sealed, smoke and fumes from the engine compartment invariably migrate into the occupant compartment. A hose or tube passing through the firewall providing fuel or oil to and from the engine compartment poses a threat for such undesirable gases to pass through into the occupant compartment via apertures providing access to both compartments. The prior art uses a grommet configured to fit within the aperture formed in the firewall and sized to engage an outer periphery of the fuel or oil hose. However, the fuel and oil hoses have fittings at either end to engage complimentary fittings for coupling the hoses. The opening of the grommet is smaller in diameter than the fittings that are at either end of the hose. The partial resiliency of the grommet material provides limited expansion to allow passage of a fitting through the aperture in the grommet without causing undue stress and wear in an attempt to remove a fuel or oil line having a fitting. Furthermore, passing the larger fittings through the grommet causes undue stress and wear. On the other hand, it is not feasible to pass the hose through the grommet absent the installed fittings because special tooling is needed to remove and reinstall the fittings. The present grommet design may be chamfered at the opening to facilitate and direct the hose to the centerline during assembly. However, this present grommet design is not suitable for off center positioning of the hose, which causes undue stress on both the hose and grommet. Furthermore, during more extreme angular displacements fumes and smoke leaks from the engine compartment out between the grommet and the hose extending into the occupant compartment. Such extreme angular displacements are commonly encountered with automobiles used for racing because of the limited room in both compartments as well as because of the extreme conditions these automobiles are used.

Despite the activity in the prior art in attempt to form a seal between two compartments to eliminate fumes and smoke from migrating therebetween, a need remains for simple and inexpensive means by which an occupant compartment of a vehicle can be effectively sealed against the entry of fumes and smoke from another compartment when a hose or tube extends between the two compartments.

There is also a need to provide simple and inexpensive seal components which may readily be employed with tubing or wiring with associated fittings, and that for diverse other applications, to afford such protection in a highly convenient manner, which components may in addition afford greatly improved isolation from smoke, fumes, and other environmental elements.

BRIEF SUMMARY OF THE INVENTION

The above discussed and other drawbacks and deficiencies of the prior art are overcome or alleviated by the compartment seal of the present invention. In accordance with the present invention a compartment seal is disposed about an automotive tube or hose extending from an engine compartment to prevent leakage of smoke and fumes into an occupant compartment. The compartment seal comprises a body member having an opening therethrough. The body member having a plurality of openings circumferentially arranged around said opening and having a periphery sized larger than an aperture in a wall, the plurality of openings providing a means for attaching said body member to said wall. The compartment seal further includes a seal element secured to the body member, the seal element having an aperture therethrough, the aperture in the seal element being in general alignment with the opening in said body member. The aperture in the seal element having a diameter less than a diameter of the opening in the body member. The seal element sealingly engages tubing passing through the aperture in the seal element.

In contrast to the prior art, smoke and fumes generated in the engine compartment are prevented from leaking through the seal element even during extreme angular displacements of the tubing extending through the seal element, such as encountered with automobiles used for racing, generally circle or oval track racing, during cornering. This is due to the use of a resilient seal and the seal having central openings that are about thirty-five percent smaller in diameter than that of the axle passing therethrough. The opening diameter of the prior grommet seal is about ten percent smaller in diameter than that of the tubing passing therethrough and does not lend itself to allowing a fitting connected to the tubing to pass therethrough.

Accordingly, the prior art problem of smoke and fumes leaking from the engine compartment into the occupant compartment during more sever angular displacements of the tubing, such as encountered with automobiles used for racing, generally circle or oval track racing, during cornering, is avoided, while allowing fittings on such tubing to pass through. The aforementioned prior art seal is not suitable for sufficiently resolving this prior art problem.

The above discussed and other features and advantages of the present invention will be appreciated and understood by those skilled in the art from the following detailed description and drawings.

DESCRIPTION OF THE DRAWINGS

Referring now to the drawings wherein like elements are numbered alike in the several FIGURES.

DESCRIPTION OF THE PREFERRED EMBODIMENT

Figure 1:
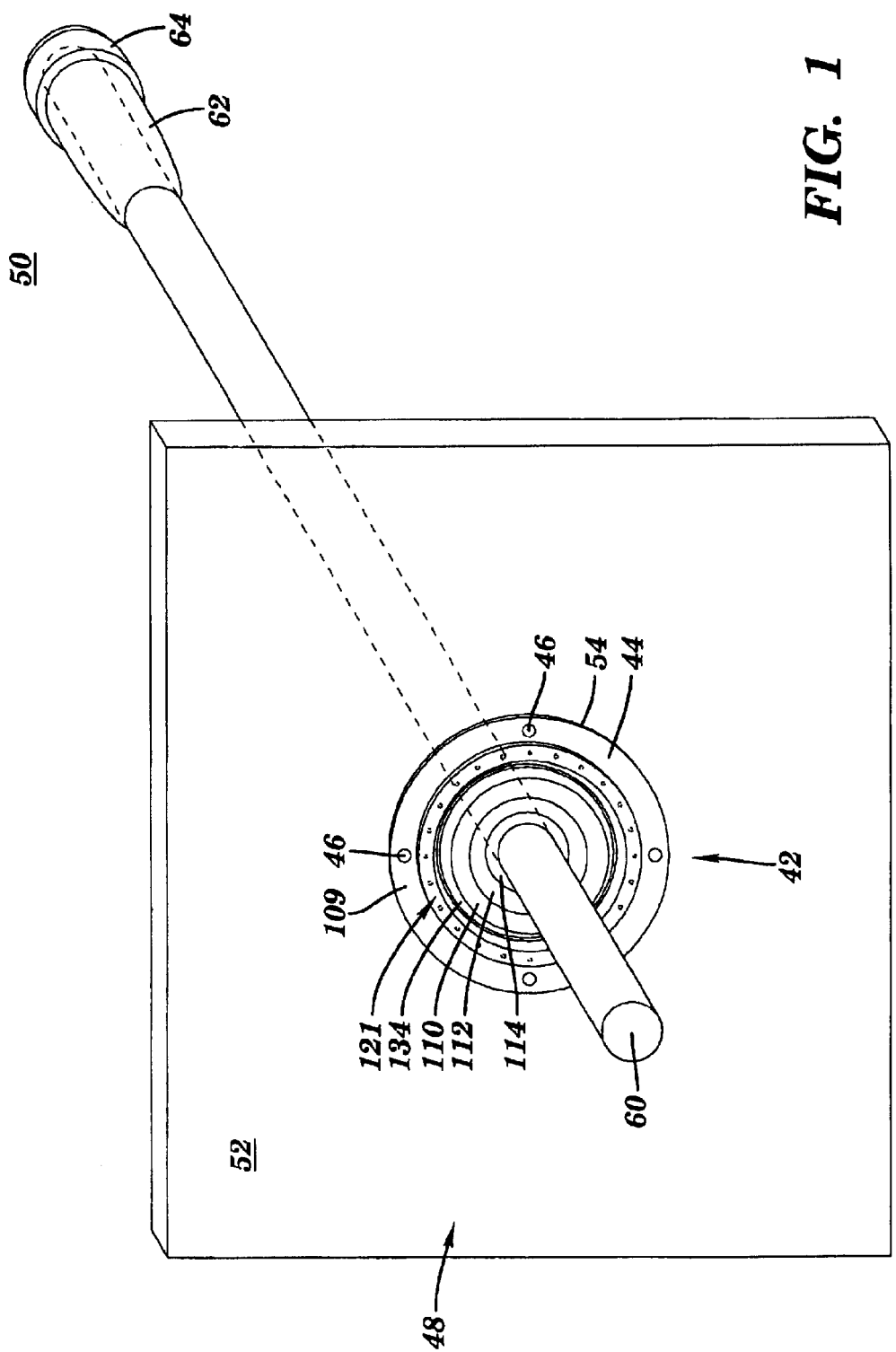
FIG. 1 is a perspective view of a compartment seal disposed in a firewall of a vehicle.
Figure 2:
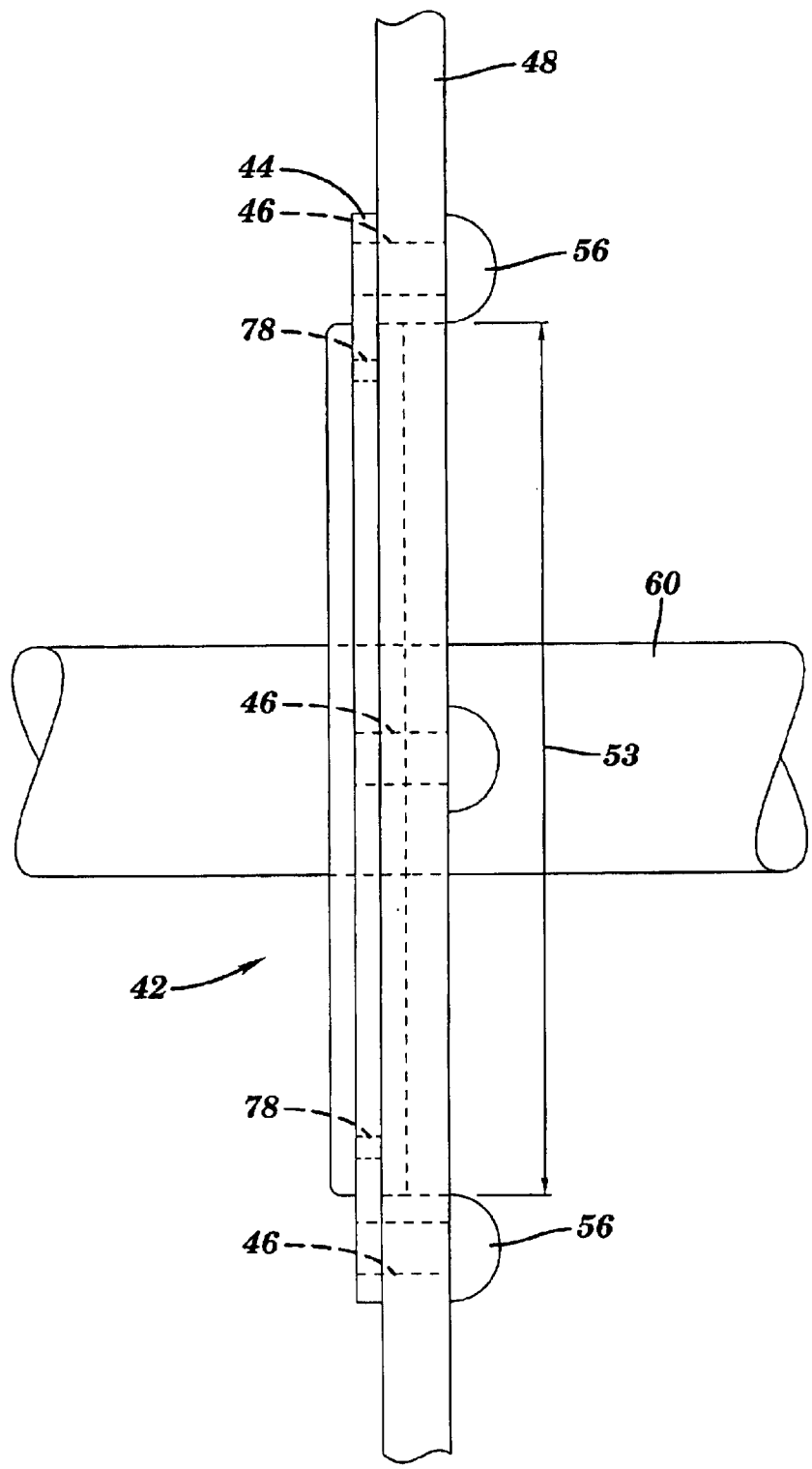
FIG. 2 is a side view of the compartment seal of FIG. 1 with a hose, partially shown, extending therethrough.

Referring to FIGS. 1–4, a compartment seal in accordance with one embodiment is shown generally at 42. Compartment seal 42 comprises a rigid annular body member 44 having four apertures 46 circumferentially thereabout. Each aperture 46 is preferably spaced equidistant from one another to provide a manner in which seal 42 may be mounted to an automotive firewall 48 separating an engine compartment 50 from an occupant compartment 52. Body member 44 is mounted over an opening 53 (FIG. 2) configured in firewall 48. A diameter 54 of body member 44 is preferably larger than a diameter of the opening 53 configured in firewall 48 for attaching body member 44 to firewall 48 via apertures 46 and fasteners 56 (See FIG. 2). Fasteners 56 include bolts, rivets and the like. Body member 44 is preferably comprised of metal, and more preferably aluminum. An automotive hose or tubing 60 passes through an opening 66 (See FIG. 3) in body member 44. Hose 60 may be an oil or fuel line providing fluid communication to an engine component in engine compartment 50. Hose 60 includes a fitting 62 for coupling with a component to provide the fluid communication. Fitting 62 includes flats 64 for engaging with a wrench or pliers to securely engage fitting 62 to another hose or corresponding component. It will be appreciated by one skilled in the pertinent art that an outside diameter of flats 64 is larger than an outside diameter of hose 60, but smaller than opening 66 formed in body member 44.

A seal element 72 is secured within opening 66 of body member 44 by attaching seal element 72 to a first surface 74 and a second surface 76 of a body member 44 secured to surfaces 74, 76, for example, by bonding or other known means (e.g., adhesive bonding, chemical bonding or mechanical means of attachment). In a preferred embodiment shown in FIG. 3, body member 44 includes apertures 78 circumferentially disposed proximate opening 66 for allowing seal element to be injection molded to body member 44. In this manner, when seal element 72 is injection molded, seal element material flows through each aperture 78 connecting portions of seal element 72 depending from first and second surfaces 74, 76 of body member 44, thus providing axial and rotational retention of seal element 72 relative to body member 44. Seal element 72 is preferably comprised of a polymer such as nitrile or neoprene as well as plastics or other suitable sealing materials (e.g., rubber, preferably a fire retardant rubber).

Seal element 72 is defined from an outer circumferential edge 84 extending to define a first flat portion 85 disposed on either side of body member 44 by U-shaped portion 86. An interior portion 88 of U-shaped portion 86 attaches to first and second surfaces 74, 76 of body member 44 while an apex 90 of U-shaped portion 86 engages an edge 92 defining opening 66 of body member 44.

Figure 3:
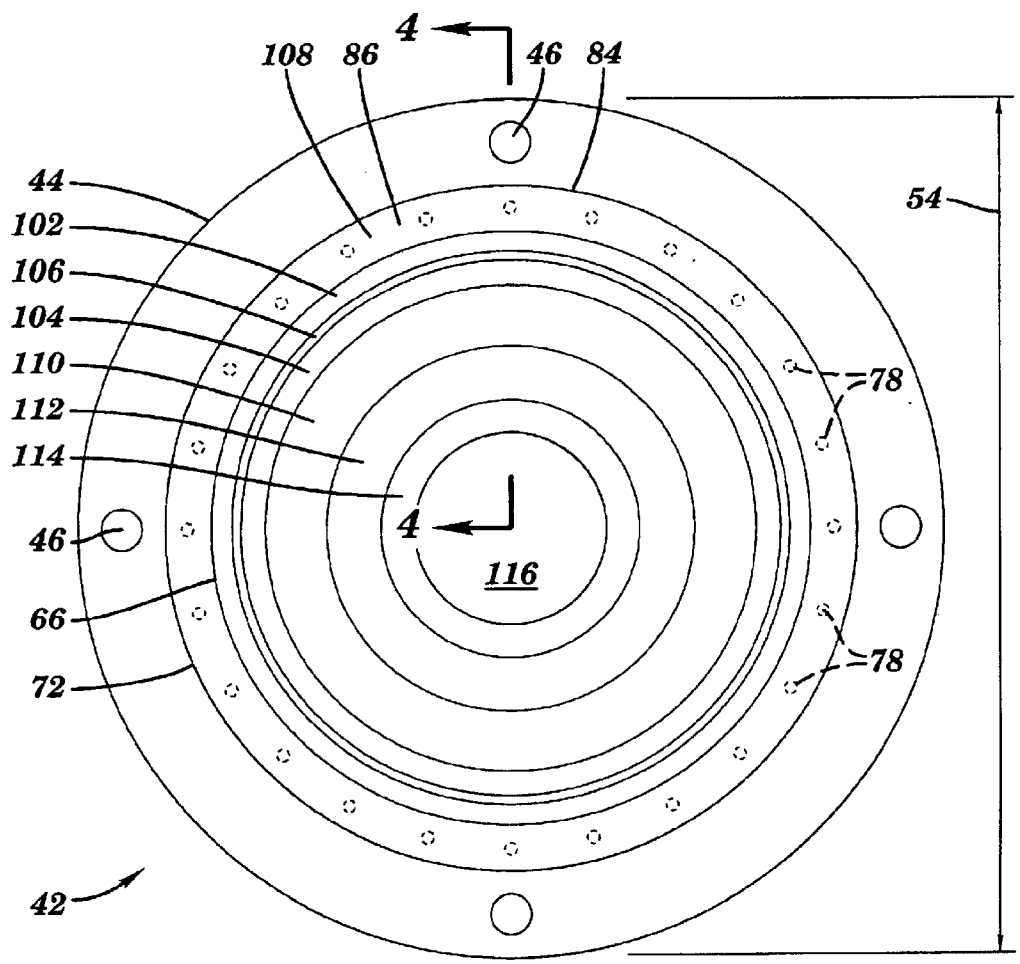
FIG. 3 is a first end view of the compartment seal of FIG. 1.
Figure 4:
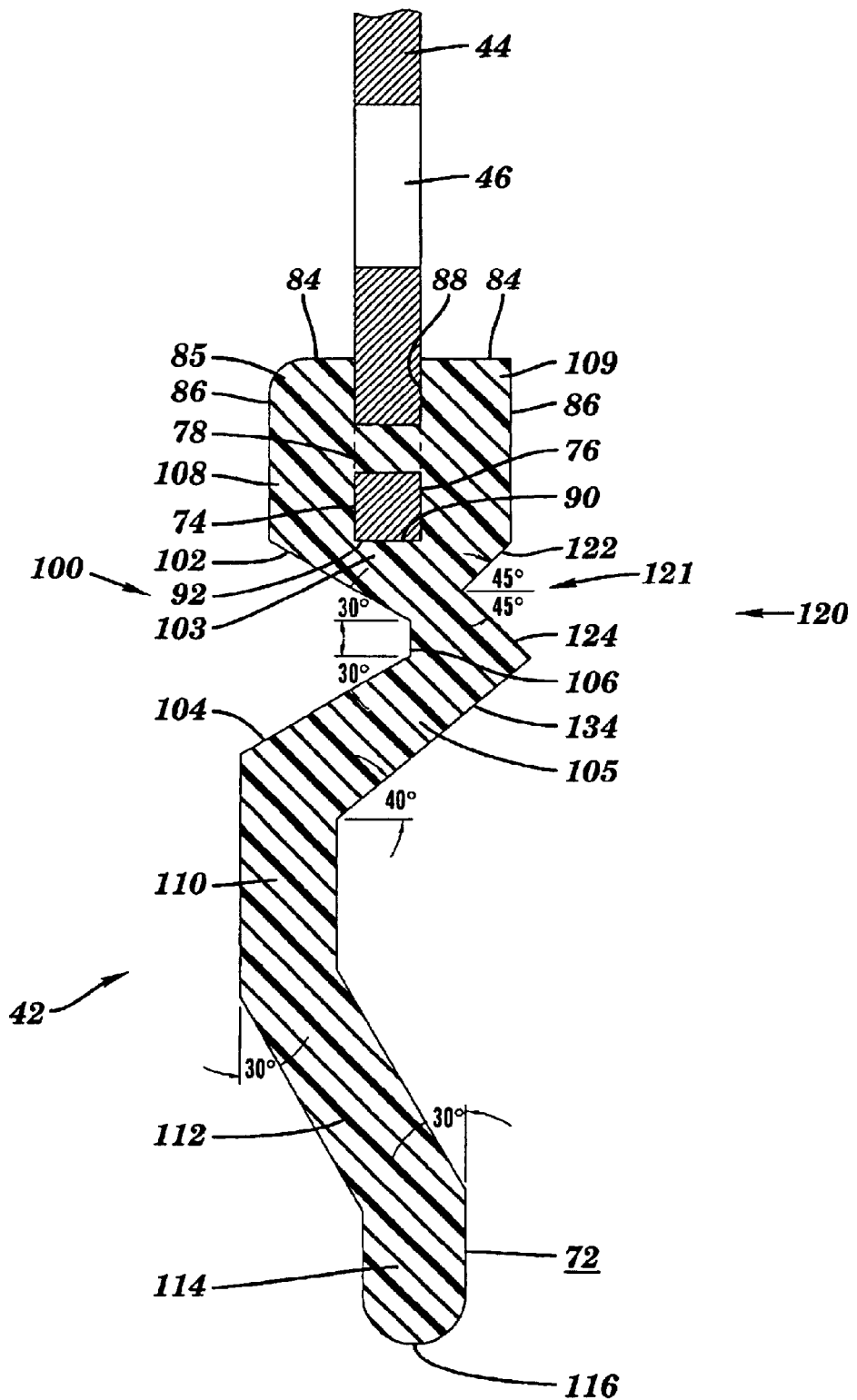
FIG. 4 is a partial view of the compartment seal taken along the line 3—3 in FIG. 3.

Referring to FIGS. 3 and 4, a first side 94 of seal element 72 extends from U-shaped portion 86 on first side 94 forming a V-portion 100 followed by a second flat portion 110. V-portion 100 is defined by a first edge 102 of a first inclined portion 103 and a second edge 104 of a second opposing inclined portion 105 forming complementary angles of about 30 degrees relative to edge 92 or about 60 degrees relative to second flat portion 110. First and second edges 102, 104 are joined via an intermediary flat portion 106 that is substantially parallel with legs 108 and 109 forming U-shaped portion 86. Second flat portion 110 is followed by a third inclined portion 112 that extends to a third flat portion 114 that is substantially parallel to second and intermediary flat portions 110, 106. Third inclined portion 112 forms a 30 degree angle relative to second and third flat portions 110, 114 joining the same. Third flat portion 114 terminates in a central opening (or aperture) 116. Opening 116 formed by termination of flat portion 114 is smaller in diameter than a hose or tube passing therethrough by about thirty-five percent. It will be appreciated that the contacting portion of the seal (i.e., portion 114) is substantially thinner than the contacting portion of the aforementioned prior art grommet seal, whereby translational and rotational friction between the hose/tube and the seal are significantly reduced. Heretofore it was believed that a thicker and thereby harder seal would provide a better seal. However, when pressure is applied to one side of the prior art grommet the opposing side does not follow due to the thickness and rigidity of such grommets, in addition to preventing passage of installed fittings 62. The seals of the present invention do not suffer from this problem, since the opposing side of the seal is not required to follow the side of the seal under force in order to maintain the seal.

Still referring to FIGS. 3 and 4, an opposite side 120 of side 94 of seal element 72 will be described. Leg 109 of U-shaped portion 86 extends to a second V-portion 121. Second V-portion is defined by a first edge 122 and a second edge 124 joining first and second opposing inclined portions 103 and 105 forming complementary angles of about 45 degrees relative to edges 84, 92 and relative to second flat portion 110. Second V-portion 121 forms a V-channel that is less deep than V-portion 100. The vertex of each V-portion 100, 121 is offset from one another as shown in FIG. 4 and reside on side 120 of seal element 72. It will be noted that seal element 72 is thinnest proximate the vertex formed by joining edges 122 and 124 along a length defining seal element 72. Second edge 124 is followed by an edge 134 that is opposite edge 104 defining second opposing inclined portion 105. Edge 134 extends from second edge 124 and meets with flat portion 110 at an angle of about 40 degrees relative to edges 84, 92 or about 50 degrees relative to second flat portion 110. As edge 134 extends from second edge 124, seal element thickens until meeting with flat portion 110. From flat portion 110 to an end of portion 114 defining opening 116, the thickness of seal element 72 remains substantially the same.

Referring to FIG. 1, seal element 72 provides for a significant amount of angular displacement of an hose 60 from the center line without loss of the seal established between the seal element 72 and the hose 60, whereby smoke and fumes are prevented from escaping therethrough. Such extreme angular displacements are commonly encountered with automobiles used for racing where available space is limited and where hoses are generally subjected to vibration and centrifugal forces during cornering that is common at racing speeds.

The sealing element will usually be fabricated by molding the first flat portion 85 directly upon an edge 92 of the metal body 44, which will advantageously constitute, or provide, a circumferential flange portion of an interior portion of a washer. To ensure a tight and strong bond with the elastomeric material forming seal element 72, the edge 92 and surfaces 74, 76 proximate edge 92 of the washer or body member 44 will desirably be roughened. In the especially preferred embodiments, moreover, the edge 92 and proximate surfaces 74, 76 will carry an agent to increase adhesion, the choice of which will depend upon the composition of the material used to produce the first flat portion 85 itself.

It will be appreciated that the components of which the assembly of the invention is comprised will normally be made of metal (e.g., steel, aluminum, brass, etc.), except of course for the sealing element. As to the latter, any suitable natural rubber or synthetic polymer may be employed; neoprene rubber, polyurethanes, styrene/butadiene rubbers, nitrile elastomers, and silicone resins might be mentioned as typical, but the selection of a suitable material for any given application will be evident to those skilled in the art. In addition to providing the requisite flexibility, resiliency and durability under the variety of conditions to which the compartment seal might be exposed, the material from which the sealing element is formed must be capable of producing a rubber-tearing bond with the metal element. As indicated above, that may be promoted by the use of an adhesive, a bonding agent, a chemical surface activator, or the like (the choice of which will also be evident to those skilled in the art), as well as by roughening of the surface of the component to which the rubber is to be bonded (e.g., by sand-blasting or the equivalent), or by other means. Normally, the sealing component will be integrally formed by molding of the elastomeric material directly to the metal piece, as by a compression, injection or transfer molding technique; bonding of preformed, separate seal elements may however also be feasible. Furthermore, it will be understood that although the body member 44 and seal element 72 attached to the body member have been illustrated and discussed in a circular configuration, any configuration is contemplated for the body member and seal element attached to the body member as long as the configuration is suitable to cover an opening of a wall and suitable for attaching to the wall.

Thus, it can be seen that the present invention provides simple and inexpensive means by which tubing extending between compartments can be effectively sealed against the entry of foreign matter, such as smoke and fumes. It also provides simple and inexpensive sealing components that are suitable for use in a vehicle firewall or dash assembly, to afford such protection in a convenient and highly effective manner.

Advantages obtainable by employment of the system embodying the invention are numerous. As used in an automotive engine compartment or fuel and oil lines extending from the engine compartment into the driver's area, for example, they include:

(1) Simpler initial installation.

(2) Elimination of specialty tools to install fittings on the end of fuel and oil lines for installation or removal of such lines from the firewall.

(3) Freedom to schedule installation or removal of fuel and oil lines, either individually or preferably as an entire sealed system, on a production line before or after the device or devices being operated by the system are installed in place.

(4) Time saving when repairs must be made to the fuel and oil line components or the lines themselves. The lines are easily removed with coupling fittings installed without having to disconnect such fittings first and later reinstall the same using expensive tooling when working with components connected to such oil and fuel lines or the lines themselves. In the system of this application, for example, the fuel line from a rear mounted gas tank may be quickly and easily removed by disconnecting it from the rear tank, releasing its mounting means, whether a clip or other means, and drawing it easily through the seal mounted to the firewall and into the engine compartment where it may be readily disconnected, repaired or replaced and reinstalled.

(5) It performs more efficiently than other, more complicated seals without the complexity and losses of time, materials and effort of prior designs.

Similar advantages are present when the system embodying the invention is used with a wiring harness or other electrical wires passing through a firewall or between different compartments in general.

The compartment seal disclosed and claimed provides for greater flexibility of tubing and wiring extending between compartments in minimum space, and the ability to maintain a sealed system without the need to remove and reinstall corresponding fittings on the ends of the tubing or electrical connectors on the ends of electrical wires, and the like.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A compartment seal comprising:

a body member having an opening therethrough, said body member having a plurality of openings circumferentially arranged around said opening, said body member having a periphery sized larger than an aperture in a wall, said plurality of openings providing a means for attaching said body member to said wall; and a seal element secured to said body member, said seal element having an aperture therethrough, said aperture in said seal element being in general alignment with said opening in said body member and defined by a generally flat portion terminating at said aperture of said seal eleent substantially coplanar with a plane defining said body member, said aperture in said seal element having a diameter less than a diameter of said opening in said body member, said seal element configured to provide a sole means to sealingly engage tubing passing through said aperture in said seal element, and wherein said seal element comprises an outer first generally flat portion; a first inclined portion depending from said first flat portion; a second opposing inclined portion depending from said first inclined portion; a second generally flat portion depending from said second inclined portion; a third inclined portion depending from said second flat portion; and a third flat portion and terminating at said aperture of said seal element.

2. The compartment seal of claim 1 wherein said opening in said body member is in general alignment with said aperture in said wall, said plurality of openings are aligned with a surface of said wall defining said aperture for fastening said body member to said wall.

3. The compartment seal of claim 1 wherein said body member is substantially planar on at least one surface for attachment to an opposing surface.

4. The compartment seal of claim 1 wherein said seal element is generally nonplanar.

5. The compartment seal of claim 1 wherein said seal element further comprises:

a generally conically shaped portion about said aperture.

6. The compartment seal of claim 1 wherein said first and second opposing inclined portions form complementary angles of about 60 degrees on a first side of said seal element relative to said second flat portion, while first inclined portion forms an angle of about 45 degrees and second opposing inclined portion forms an angle of about 50 degrees on a second side of said seal element relative to said second flat portion.

7. The compartment seal of claim 6 wherein said third inclined portion forms an angle of about 30 degrees relative to said second flat portion, whereby resiliency in said aperture of said seal element is produced by said first and second inclined portions and increased at said third inclined portion.

8. The compartment seal of claim 1 wherein said first inclined portion tapers to a thin portion in joining with said second inclined portion and said second inclined portion tapers to a thick portion in joining with said second flat portion.

9. The compartment seal of claim 1 wherein said first flat portion is configured in a U-shape having a first and second leg defining an interior portion of said U-shape secured to either side of said body member.

10. The compartment seal of claim 9 wherein said body member includes another plurality of apertures circumferentially disposed proximate said opening, said another plurality of apertures providing a means for axial and rotational retention of seal element relative to said body member, whereby said another plurality of apertures provides fluid communication between said first and second legs of said first flat portion.

11. The compartment seal of claim 10 wherein said fluid communication includes one of adhesive and injection molding material.

12. The compartment seal of claim 1 wherein said aperture in said seal element has a diameter which is about thirty-five percent smaller than a diameter of tubing passing therethrough.

13. The compartment seal of claim 1 wherein said tubing includes one of an oil line, a fuel line, and electrical wiring.

14. The compartment seal of claim 1 wherein said body member is fabricated from metal.

15. The compartment seal of claim 14 wherein said seal element is molded upon said body member.

16. The compartment seal of claim 15 wherein said body member includes an adhesion-promoting substance carried on a marginal portion defining said opening thereof for enhancement of the level of bond strength of said sealing element thereto.

17. A compartment seal comprising:

a body member having an opening therethrough; and a seal element secured to at least one side of said body member, said seal element having an outer first generally flat portion, a first inclined portion depending from said first flat portion, a second opposing inclined portion depending from said first inclined portion, a second generally flat portion depending from said second inclined portion, a third inclined portion depending from said second flat portion, and a third flat portion depending from said third inclined portion terminating at an aperture of said seal element, said aperture in said seal element being in general alignment with said opening in said body member, said aperture in said seal element having a diameter less than a diameter of said opening in said body member, said seal element for sealingly engaging tubing passing through said aperture in said seal element.

18. The compartment seal of claim 17 wherein said first and second inclined portions provide resiliency in said seal element whereby resiliency is further increased at said third inclined portion.

19. The compartment seal of claim 18 wherein said seal element is secured to said body member using a plurality of apertures circumferentially disposed proximate said opening of said body member.

* * * * *